US009722247B2

(12) United States Patent
Zhang et al.

(10) Patent No.: US 9,722,247 B2
(45) Date of Patent: Aug. 1, 2017

(54) VANADYL PHOSPHATES AS HIGH ENERGY DENSITY CATHODE MATERIALS FOR RECHARGEABLE SODIUM BATTERY

(71) Applicants: Toyota Motor Engineering & Manufacturing North America, Inc., Erlanger, KY (US); The Research Foundation for The State University of New York, Albany, NY (US)

(72) Inventors: Ruigang Zhang, Ann Arbor, MI (US); Fuminori Mizuno, Ann Arbor, MI (US); Chen Ling, Ann Arbor, MI (US); M. Stanley Whittingham, Vestal, NY (US); Ruibo Zhang, Vestal, NY (US); Zehua Chen, Jiaozuo (CN)

(73) Assignees: Toyota Motor Engineering & Manufacturing North America, Inc., Erlanger, KY (US); The Research Foundation for The State University of New York, Albany, NY (US)

( * ) Notice: Subject to any disclaimer, the term of this patent is extended or adjusted under 35 U.S.C. 154(b) by 163 days.

(21) Appl. No.: 14/735,894

(22) Filed: Jun. 10, 2015

(65) Prior Publication Data
US 2016/0365577 A1    Dec. 15, 2016

(51) Int. Cl.
*H01M 4/58* (2010.01)
*H01M 4/62* (2006.01)
*H01M 4/136* (2010.01)
*H01M 10/054* (2010.01)
*H01M 10/0569* (2010.01)
(Continued)

(52) U.S. Cl.
CPC ........... *H01M 4/5825* (2013.01); *C01B 25/45* (2013.01); *H01M 4/136* (2013.01); *H01M 4/622* (2013.01); *H01M 10/054* (2013.01); *H01M 10/0568* (2013.01); *H01M 10/0569* (2013.01); *H01M 2220/20* (2013.01); *H01M 2300/0028* (2013.01)

(58) Field of Classification Search
CPC .... H01M 4/5825; H01M 4/622; H01M 4/136; H01M 10/054; H01M 10/0568; H01M 10/0669; H01M 2300/0028; H01M 2220/20; C01B 25/45; H01G 11/30; H01G 11/62
See application file for complete search history.

(56) References Cited

U.S. PATENT DOCUMENTS 6,872,492 B2   3/2005  Barker et al.
2004/0048157 A1  3/2004  Neudecker et al.
(Continued)

OTHER PUBLICATIONS

Chen et al.; "Electrochemical Behavior of Nanostructure epsilon-VOPO4 over Two Redox Plateaus"; Aug. 16, 2013; Journal of the Elecrochemical Society; 160(10); A1777-A1780.*
(Continued)

*Primary Examiner* — Eugenia Wang
(74) *Attorney, Agent, or Firm* — Oblon, McClelland, Maier & Neustadt, L.L.P.

(57) ABSTRACT

A positive electrode comprising $\epsilon$-VOPO$_4$ and/or Na$_x$($\epsilon$-VOPO$_4$) wherein x is a value from 0.1 to 1.0 as an active ingredient, wherein the electrode is capable of insertion and release of sodium ions and a reversible sodium battery containing the positive electrode are provided.

22 Claims, 7 Drawing Sheets

(51) Int. Cl.
*H01M 10/0568* (2010.01)
*C01B 25/45* (2006.01)

(56) References Cited

U.S. PATENT DOCUMENTS

| | | |
|---|---|---|
| 2013/0034780 A1 | 2/2013 | Muldoon et al. |
| 2013/0115521 A1 | 5/2013 | Doe et al. |
| 2013/0260228 A1 | 10/2013 | Sano et al. |
| 2013/0302697 A1 | 11/2013 | Wang et al. |
| 2014/0106222 A1* | 4/2014 | Park .................. H01M 4/366 429/219 |

OTHER PUBLICATIONS

Johnson, et al., "Sodium-Ion Batteries", Advanced Functional Materials 23: 947-958 (2013) with Correction, Advanced Functional Materials 23:3255 (2013), www.afm-journal.de.

* cited by examiner

VANADYL PHOSPHATES AS HIGH ENERGY DENSITY CATHODE MATERIALS FOR RECHARGEABLE SODIUM BATTERY

STATEMENT REGARDING FEDERALLY SPONSORED RESEARCH OR DEVELOPMENT

This invention was made with government support under DE-SC0001294 awarded by the Department of Energy. The government has certain rights in the invention.

BACKGROUND OF THE INVENTION

The present invention is directed to rechargeable sodium-ion batteries. In particular, the invention relates to a cathode active material having a high energy density for a sodium-ion battery.

Energy conversion and storage have become more and more important in transportation, commercial and residential applications. In particular, large-scale implementation of renewable energy and the next generation of electric vehicles require development of inexpensive and efficient energy storage systems.

Lithium-ion battery technologies have been dominating the market of portable electronic devices since its first commercial use in 1991. The technology associated with the construction and composition of the lithium ion battery has been the subject of investigation and improvement and has matured to an extent where a state of art lithium ion battery is reported to have up to 200 Wh/L of energy density. However, even the most advanced lithium ion battery technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 500 Wh/L is required. As this energy density is close to the theoretical limit of a lithium ion active material, technologies which can offer battery systems of higher energy density are under investigation. In addition, the use of lithium-ion batteries in large scale applications is also challenged by the increasingly high cost of lithium and the potential supply risk. Therefore, low-cost, high-capacity, and safe alternatives that are not resource-limited are of particular interest in this field.

Sodium, whose intercalation chemistry is similar to lithium and which is an element with lower cost and higher abundance than lithium, has gained much interest recently. The concept of a battery based on sodium is similar to that of a lithium-ion battery in that a sodium-ion battery also involves the energy carried by the reversible transport of an ion ($Na^+$) between the positive and negative electrodes. However, the reaction mechanism in a sodium-ion cell may be significantly different from the mechanism in a lithium-ion cell. Indeed, the real performance of a specific material in a sodium-ion cell may be distinct from its performance in a lithium counterpart.

In comparison, sodium is less reducing than lithium (−2.71V vs. S.H.E., compared to −3.04V) and the gravimetric capacity is lower (1165 mAh $g^{-1}$ compared to 3829 mAh $g^{-1}$) (Johnson et al. Adv. Funct. Mater. 2013, 23, 947-958). The cation radius of sodium is nearly 40% larger than lithium (1.06 Å vs. 0.76 Å) and therefore, any successful intercalation host materials will possess channels and interstitial sites compatible with the larger size of the sodium cation.

For instance, graphite, the commercial anode active material in lithium-ion batteries, cannot accommodate the insertion of Na to a concentration higher than $Na_{0.0625}C_6$ and is electrochemically irreversible. As a result, graphite is unsuitable as a sodium-ion battery anode. Thus, the fundamental differences between lithium and sodium appear to dictate that it may be impossible to simply adopt the knowledge and the techniques developed for lithium-ion batteries to sodium-ion batteries. Appropriate electrode and electrolyte materials that can be used in practical sodium electrochemical cell systems need to be developed for sodium-ion batteries. One barrier to significant progress in the development of Na ion batteries is the identification and development of promising cathode candidates to date.

In ongoing studies of energy generation and storage systems, the present inventors have investigated a wide range of materials for suitability as cathode active agents in a sodium battery. Phosphate based materials have been considered as excellent cathode candidates because of their high stability and low cost. However, most phosphate cathodes show poor electronic conductivity and as a result, full capacity of the cathode can't be achieved with general charge/discharge processes. To overcome the conductivity problem, conductive material coating technique and nano-sizing the cathode material have been utilized.

Another approach to obtain a cathode of high capacity is to employ a transition metal capable of multiple electron transfer and thus able to assume more than one sodium. Vanadium is well-known to be capable of transfer of two electrons, such as from the +5 to +3 oxidation state. Thus the inventors have considered that Vanadyl phosphate ($VOPO_4$) is a material combining the merits of vanadium and of phosphate and theoretically has the possibility to show high capacity as well as good stability as a cathode active material for a sodium battery.

Vanadium phosphate materials have been described as cathode materials.

For example, U.S. Pat. No. 6,872,492 (Barker et al.) describes sodium ion batteries based on cathode materials of the general formula: $A_aM_b(XY_4)_cZ_d$. Example 4b describes synthesis of $VOPO_4 \cdot xH_2O$ and Examples 4c and 4d describe synthesis of $NaVO\ PO_4$. Charge and discharge of a cell containing a cathode of the $NaVO\ PO_4$ and a negative electrode of lithium metal is described. Sodium ion cells prepared are based on a carbon composite negative electrode and $NaVO\ PO_4F$ as the positive electrode active material.

U.S. 2013/0034780 (Muldoon et al.) describes a magnesium battery and lists $VO\ PO_4$ as a suitable positive electrode active material.

U.S. 2004/0048157 (Neudecker et al.) describes a lithium solid state thin film battery containing a lithiated vanadium oxide film as an anode and as one possible cathode material, $LiVO\ PO_4$.

U.S. 2013/0260228 (Sano et al.) describes a lithium secondary battery having as a positive electrode material, a compound of the formula: $Li_a(M)_b(PO_4)cF_d$. $LiVO\ PO_4$ is described in a preferred embodiment.

U.S. 2013/0115521 (Doe et al.) describes a magnesium secondary battery wherein the current collectors are coated with a thin protective coating. $VO\ PO_4$ is listed as a positive electrode active material.

U.S. 2012/0302697 (Wang et al.) describes a magnesium cell having a carbon or other graphitic material as a cathode active material. $VO\ PO_4$ is included in a list of other cathode active materials.

However, none of these references disclose or suggest ε-vanadyl phosphate as a high capacity cathode active material for a rechargeable sodium battery.

It is an object of this invention to provide safe, efficient and a high capacity cathode active material for use in a sodium battery.

SUMMARY OF THE INVENTION

This and other objects have been achieved according to the present invention, the first embodiment of which includes a positive electrode comprising ε-VOPO$_4$ as an active ingredient, wherein the electrode is capable of insertion and release of sodium ions. In an aspect of this embodiment the ε-VOPO$_4$ upon electrochemical cycling may contain regions of material of formula $Na_x(\epsilon\text{-VOPO}_4)$ wherein x is a value from 0.1 to 1.0.

In another embodiment, the present invention includes a sodium ion electrochemical cell having a positive electrode comprising ε-VOPO$_4$ as an active ingredient.

In a further embodiment, the present invention includes a reversible sodium battery comprising: an anode; a cathode; and an electrolyte comprising sodium ions; wherein the cathode comprises a current collector and an active material of formula (I):

ε-VOPO$_4$     (I).

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out.

The inventors are conducting ongoing studies of energy generation and storage systems, and have investigated a wide range of materials for suitability as cathode active agents in various batteries, including a sodium battery. Phosphate materials may be considered as candidate materials due to high stability and low cost. However, most phosphate cathodes show poor electronic conductivity and as a result, full capacity of the cathode can't be achieved with general charge/discharge processes. The inventors have recognized that Vanadium is capable of two electron type transfer such as from the +5 to +3 oxidation state. Thus the inventors targeted Vandyl phosphate (VOPO$_4$) for study as a cathode active material. As indicated in the Example, although initial study has shown vandyl phosphate may not be suitable as a cathode material for a magnesium battery, utility as a cathode active material for a sodium battery has been discovered.

Seven distinct VOPO$_4$ structures or phases are known to have been reported to date. All of the reported structures contain VO$_6$ octahedra sharing vertices with PO$_4$ tetrahedra. The oxygen polyhedron of vanadium is irregular so that it is often considered as a VO$_5$ square pyramid with a very short apical vanadyl bond (V=O) and a much more remote sixth oxygen atom (V . . . O). These seven phases can be distinguished as:

α$_I$: has a lamellar structure with alternating antiparallel V=O bonds pointing inside the layers.

α$_{II}$: also has a lamellar structure with antiparallel V=O bonds pointing outside the layers.

γ: is an intermediate form between α$_I$ and α$_{II}$ with half parallel V=O bonds pointing inside, half outside the layers.

δ: has antiparallel V=O bonds pointing half inside, half outside the layers. The vanadyl chains point to different directions in the unit cell.

ω: shows disordered vanadyl chains in the [1 0 0] and [0 1 0] directions of the tetragonal cell.

β: All vanadyl chains are parallel and tilted to form zigzag O=V . . . O=V chains.

ε: The structure is a distorted form of β-phase and differs in terms of tilted O=V . . . O angle.

Figure 5:
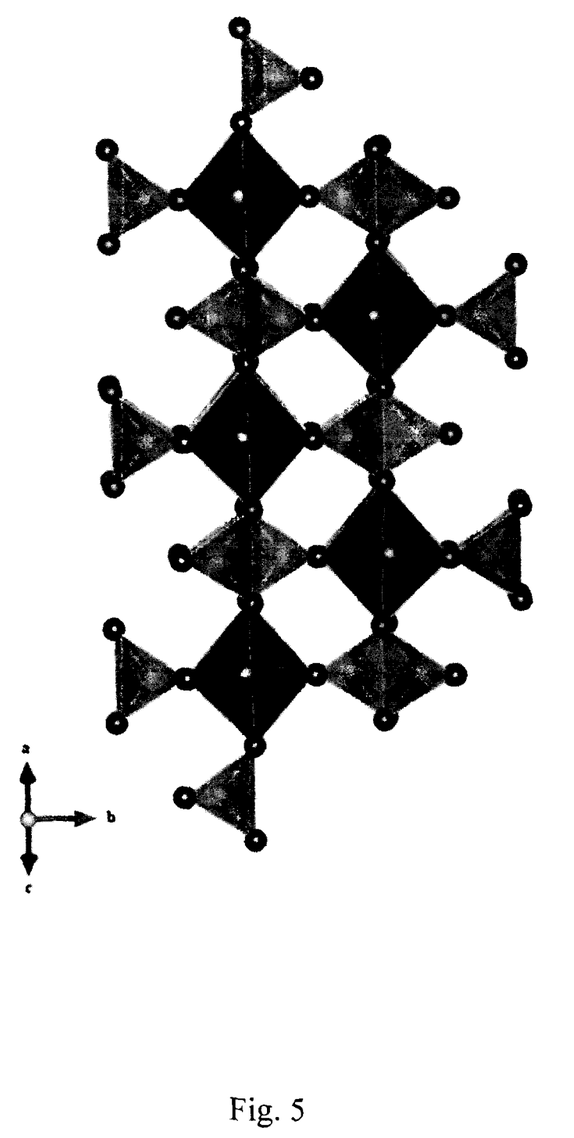
FIG. 5 shows a structural diagram of ε-VOPO$_4$.

The structure of ε-VOPO$_4$ is shown in FIG. 5. Surprisingly, the inventors have discovered that the ε-VOPO$_4$ is capable of insertion and deinsertion of sodium ions without significant degradation of the structure after the first insertion cycle. As indicated in the Example, the first discharge profile was much different from that of the following cycles. Without wishing to be bound by theory the inventors believe that the ε-VOPO$_4$ may initially undergo a structural rearrangement during initial Na insertion. This irreversible structure change, if occurring may cause a high irreversible capacity; the initial discharge capacity dropped from ~130 mAh/g to ~58 mAh/g and half of the inserted Na ions may have been trapped in the structure after charging.

The inventors believe that a sodium ion insertion product is formed within the ε-VOPO$_4$ that may be described by the formula:

$Na_x(\epsilon\text{-VOPO}_4)$ wherein x is a value from 0.1 to 1.0. Retention of material of this formula within the ε-VOPO$_4$ matrix may account for the performance shown in FIG. 3 after cycle 1. Thus upon electrochemical charging the sodium insertion product of the above formula may be formed as sodium ions enter into the ε-VOPO$_4$ crystal structure. As a result the active cathode may contain regions of ε-VOPO$_4$ and regions of Na$_x$(ε-VOPO$_4$).

Alternatively, at least part of the capacity drop observed in Example 1 may be related to the charging cutoff voltage because the charge capacity may be limited by the relative low voltage stability of the Na-TFSI electrolyte employed in the Example. As in other battery systems identification of highly stable electrolytes compatible with ε-VOPO$_4$ and suitable anode structures may be necessary to develop and achieve the full potential offered by the ε-VOPO$_4$ as a cathode active material.

In a first embodiment, the present invention includes a positive electrode comprising ε-VOPO$_4$ as an active ingredient, wherein the electrode is capable of insertion and release of sodium ions.

In another embodiment, the present invention includes a sodium ion electrochemical cell having a positive electrode comprising ε-VOPO$_4$ as an active ingredient.

In a further embodiment, the present invention includes a reversible sodium battery comprising: an anode; a cathode; and an electrolyte comprising sodium ions;

wherein the cathode comprises a current collector and an active material of formula (I):

$$\epsilon\text{-VOPO}_4 \tag{I}$$

Any suitable anode structure and composition may be employed in the reversible sodium ion battery of the present invention. Anode structure and composition is not an element of the present invention. Examples of anode materials identified for anode construction of a sodium battery are shown in the following Table.

The energy density in Table 1 is calculated with a cathode voltage at 3.4 V.

TABLE 1

| anode | sodiation voltage (V vs Na/Na$^+$) | capacity (mAh/g) | energy density (Wh/kg) | volumetric expansion | diffusion barrier (eV) |
|---|---|---|---|---|---|
| hard carbon*$^a$ | 0.01 | 300 | 1017 | ~0% | |
| tin*$^b$ | 0.20 | 845 | 2704 | 318% | |
| antimony*$^c$ | 0.58 | 659 | 1858 | 285% | |
| titanate*$^d$ | 0.3 | 300 | 930 | ~10% | 0.25-0.41 |
| BC$_3$ boron-doped graphene | 0.44 | 762 | 2256 | ~0% | 0.16-0.28 |

*$^a$Komaba et al., "Electrochemical Na Insertion and Solid Electrolyte Interphase for Hard-Carbon Electrodes and Application to Na-Ion Batteries," Adv. Func. Mater. 21, 3859, 2011.
*$^b$Zhu et al., "Tin Anode for Sodium-Ion Batteries Using Natural Wood Fiber as a Mechanical Buffer and Electrolyte Reservoir," Nano Lett., 13, 3093, 2013.
*$^c$Qian et al., "High capacity of Na-storage and superior cyclability of nanocomposite Sb/C anode for Na-ion batteries," Chem. Commun. 48, 7070, 2012.
*$^d$Senguttuvan et al., "Low-Potential Sodium Insertion in a NASICON-Type Structure through the Ti(III)/Ti(II) Redox Couple," J. Am. Chem. Soc. 135, 3897, 2013; Sun et al., "Direct atomic-scale confirmation of three-phase storage mechanism in Li$_4$Ti$_5$O$_{12}$ Anodes for room temperature sodium-ion batteries," Nature Communications, 4, 1870, 2013.

Figure 1:
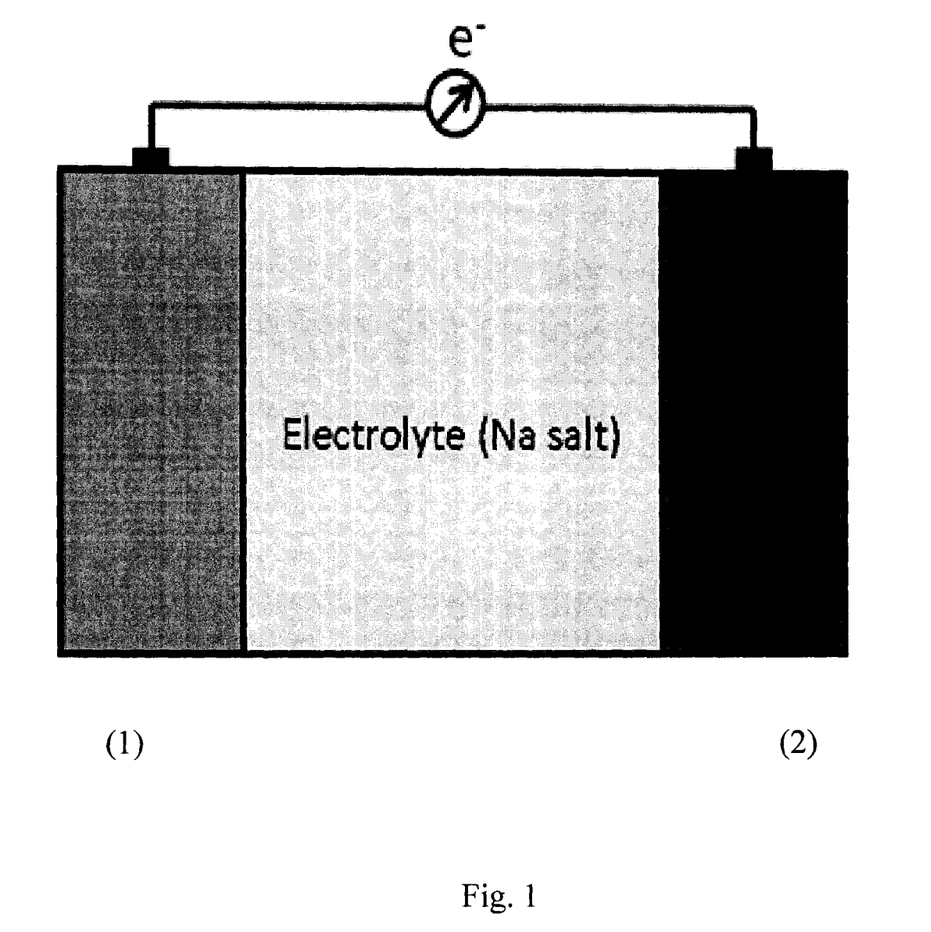
FIG. 1 shows a schematic diagram of a sodium-ion battery according to one embodiment of the invention.
Figure 2:
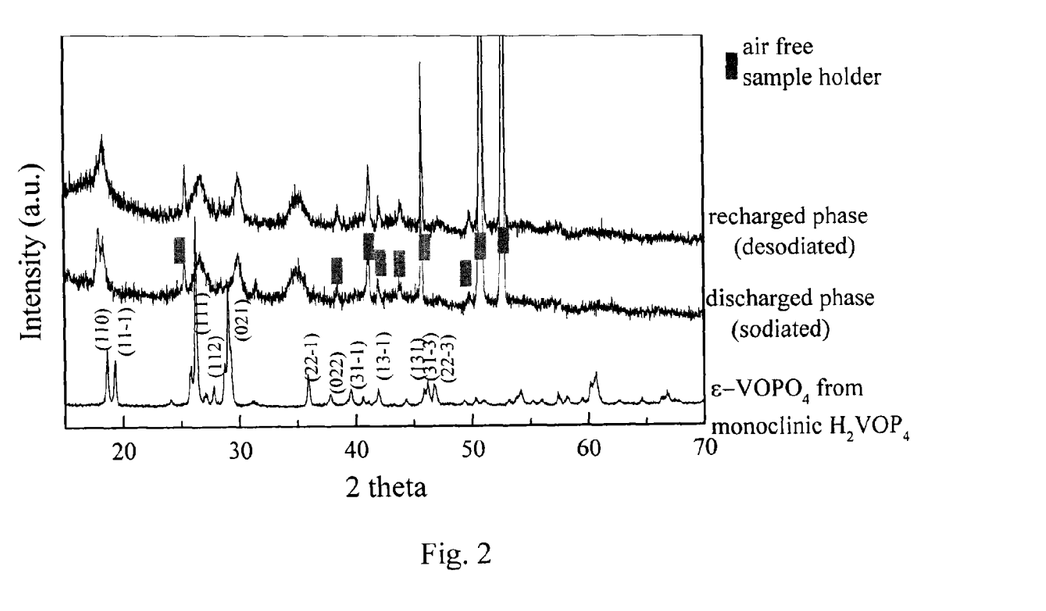
FIG. 2 shows XRD patterns of ε-VOPO$_4$ before and after sodiation reaction.

A schematic diagram of a sodium-ion battery according to one embodiment of the invention is shown in FIG. 1 where an anode (1) and a cathode (2) are separated by a sodium electrolyte.

Ongoing studies within the inventors' laboratories have identified a boron-doped graphene sheet as an excellent anode material for rechargeable sodium-ion batteries. This invention is disclosed by Ling et al. in U.S. application Ser. No. 14/090,143, filed Nov. 26, 2013.

The anode containing any of the above-listed materials may be may be mixed with other electrically conductive materials and binders. Examples of electrically conductive materials include carbon black and vapor ground carbon fibers. Examples of binders include polyvinylidene fluoride (PVDF), sodium alginate, and sodium carboxymethyl cellulose.

In addition to ε-VOPO$_4$, the cathode may further contain any cathode material suitable for sodium-ion insertion and release. Suitable auxiliary materials may include phosphate based materials such as NaFePO$_4$, NaVPO$_4$F, Na$_3$V$_2$(PO$_4$)$_2$F$_3$, Na$_2$FePO$_4$F, and Na$_3$V$_2$(PO$_4$)$_3$; oxides such as Na$_x$CoO$_2$ wherein x varies in a range of from 0.4 to 1, orthorhombic Na$_{0.44}$MnO$_2$, layered sodium iron oxides NaFeO$_2$, sodium chromium oxide NaCrO$_2$, layered NaNi$_{0.5}$Mn$_{0.5}$O$_2$, and NaV$_6$O$_{15}$ nanorods; layer sulfides such as Na$_x$TiS$_2$; perovskite transition metal fluorides such as NaFeF$_3$; Na$^+$ superionic conductor (NASICON)-related compounds, or a mixture thereof.

The cathode active material may be mixed with conductive additives and binders recognized by one of skill in the art as suitable for sodium-ion batteries. For example, suitable binders may include PVDF, polytetrafluoroethylene (PTFE), styrene butadiene rubber (SBR), and polyimide. Suitable conductive additives may include carbonaceous materials such as acetylene black.

The cathode active material may be present as a sheet, ribbon, particles, or other physical form. An electrode containing the cathode active material may be supported by a current collector. A current collector may include a metal or other electrically conducting material. The current collector may be formed of carbon, carbon paper, carbon cloth or a metal or noble metal mesh or foil.

Suitable electrolytes include Na-based aqueous electrolytes such as Na$_2$SO$_4$, NaNO$_3$, NaClO$_4$, Na$_3$PO$_4$, Na$_2$CO$_3$, and NaOH; sodium salts such as NaPF$_6$ or NaClO$_4$. Suitable solvents may be any solvent which is stable within the electrochemical window of the cell and is inert to other components of the cell. Examples of suitable solvents include carbonate solvents such as ethylene carbonate, diethyl carbonate, and propylene carbonate and organic nitriles such as acetonitrile. Additionally, the electrolyte may be a nonaqueous polymer electrolyte such as a gel polymer electrolytes, a solid ceramic electrolyte such as sodium β"-alumina solid electrolyte (BASE) ceramic and NASICON compounds. In one embodiment, the electrolyte may include additives such as fluoroethylene carbonate (FEC) in order to, for example, improve cycling.

The battery may also include a separator which helps maintain electrical isolation between the cathode and the anode. A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

EXAMPLES

Example 1

ε-VOPO$_4$

The synthesis of this material can be found elsewhere (J. Electrochem. Soc. 160 (2013) A1777). Briefly, ε-VOPO$_4$ was synthesized from the precursor H$_2$VOPO$_4$ phase, which was prepared by a hydrothermal process at 180° C. ε-VOPO$_4$ was obtained by heating the precursor in oxygen at 500° C.

The ε-VOPO$_4$ electrodes were composed of 70 wt % as-prepared material, 20 wt % Ketjen black and 10 wt % PTFE. The mixture was ground using a mortar and pestle with the addition of 5 ml ethanol. After 30 minutes of grinding, the mixture became pliable and was pressed into a 120 μm sheet via a press roller. The ε-VOPO$_4$ PTFE sheet was dried at 120° C. under vacuum overnight. ε-VOPO$_4$ composite pellets were cut out from the sheet with 13 mm diameter (1.33 cm$^2$ area). The loading content of each electrode was about 10.6 mg. The sodium metal pressed on a stainless steel foil was used as counter and reference electrodes and 1 M NaTFSI in acetonitrile was electrolyte. The electrochemical properties of these samples were evaluated in 2032-type coin cells and a Celgar 2400 separator (Hoechst Celanese) was used.

The cycling was performed in the voltage region between 1.7-4.0 V for the Na battery at a constant current of 25 μA using a Bio-Logic potentiostat/galvanostat VMP battery testing system. All of the batteries were kept in an oven at constant temperature (25±0.5° C.) during the test.

All XRD characterization was carried out on a Rigaku Smartlab diffractometer using Cu Kα 1.54 Å radiation. During the XRD scan, electrode pellets were protected in an air-free sample holder with Be window.

Figure 3:
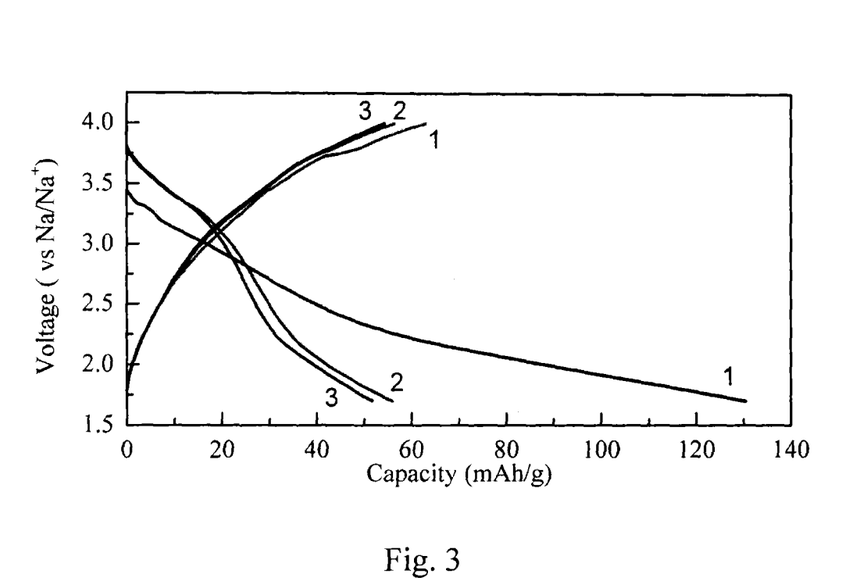
FIG. 3 shows the first three cycles of Na insertion and deinsertion of the sodium battery having a cathode containing ε-VOPO$_4$ constructed in the Example.
Figure 4:
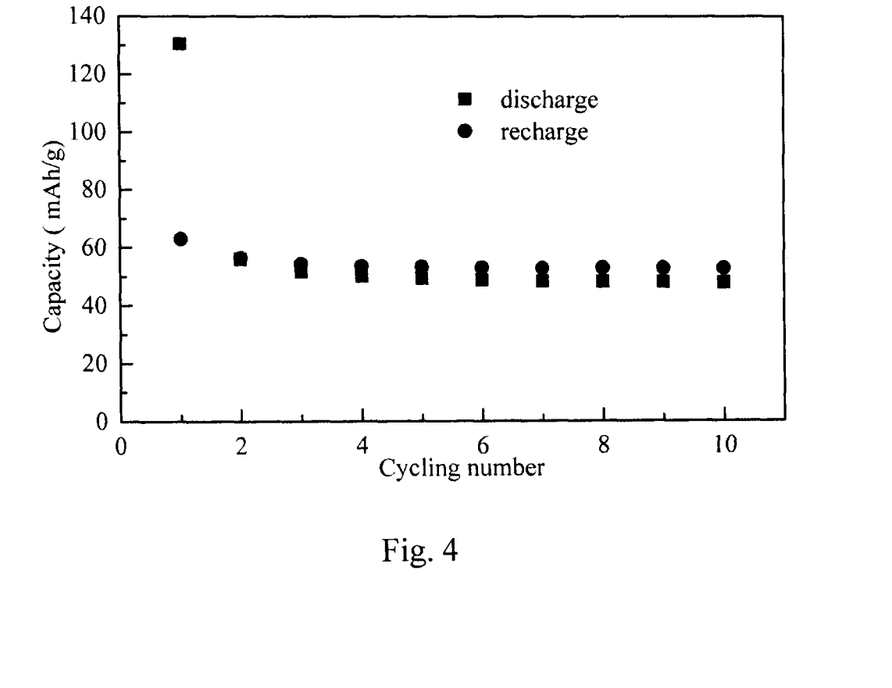
FIG. 4 shows the cycling capacity retention of the sodium battery at 60 mAh/g over 10 cycles.

FIG. 3 shows the first three cycles of Na insertion and deinsertion of ε-VOPO$_4$ obtained in the sodium battery. The first discharge profile was much different from that of the following cycles, which may be ascribed to the structural rearrangements during Na insertion. This structure change caused a high irreversible capacity; the initial discharge capacity dropped from ~130 mAh/g to ~58 mAh/g and half of the inserted Na ions may have been trapped in the structure after charging. On the other hand, the capacity drop observed may also be related to the charging cutoff voltage because the charge capaicty could be limited by the relative low voltage stability in Na-TFSI electrolyte. The reversible capacity may be increased by use of an electrolyte having higher voltage stability. From second discharge, the cathode showed similar discharge and recharge profiles. A steady capacity retention upon cycling was observed, as shown in FIG. 4 where the capability stabilized at 60 mAh/g over 10 cycles.

Figure 6:
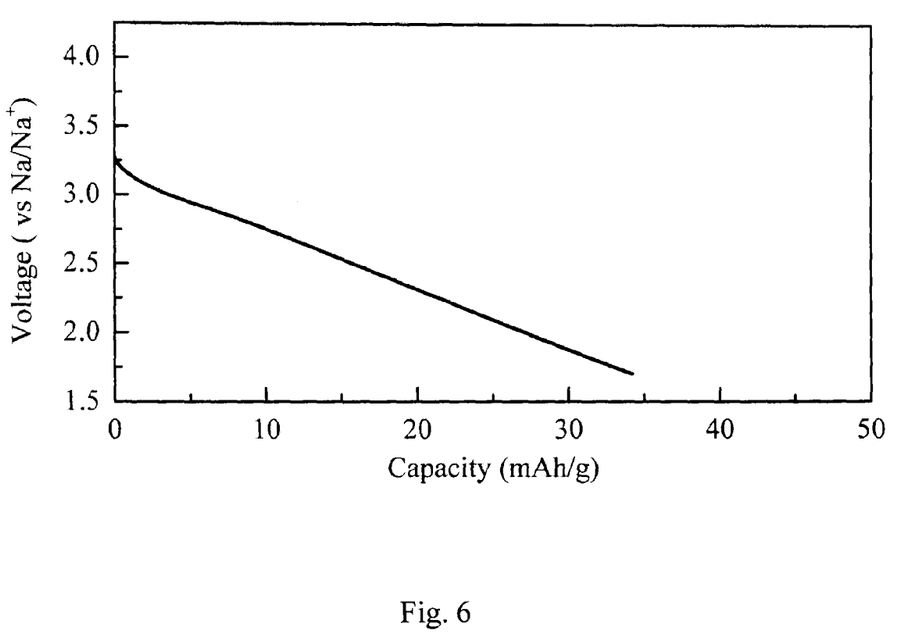
FIG. 6 shows Na insertion and deinsertion of the sodium battery having a cathode containing VOPO$_4$ according to the description of U.S. Pat. No. 6,872,492 as constructed in Example 3.
Figure 7:
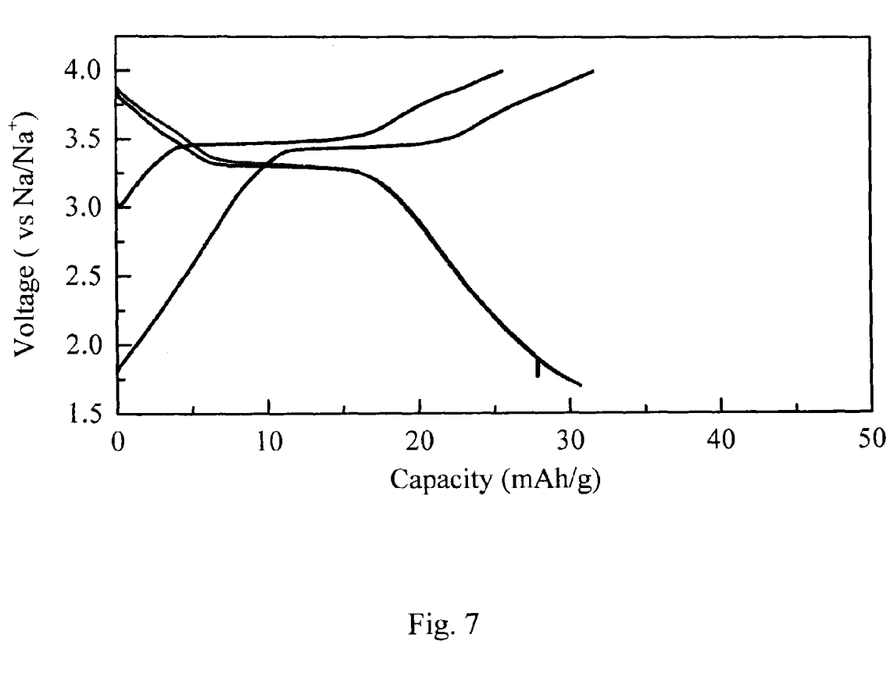
FIG. 7 shows Na insertion and deinsertion of the sodium battery having a cathode containing NaVOPO$_4$ according to the description of U.S. Pat. No. 6,872,492 as constructed in Example 2.

Example 2

α-VOPO$_4$ (According to Example 4(b) of U.S. Pat. No. 6,872,492)

α-VOPO$_4$ was prepared following Example 4(b) of Barker et al. The powder obtained was substituted for ε-VOPO$_4$ in the preparation of an electrode and electrochemical evaluation described above in Example 1. The charge-discharge curve obtained is shown in FIG. 7 and it can be recognized, especially in comparison to FIG. 3, that α-VOPO$_4$ was not capable of charge discharge cycling as demonstrated with ε-VOPO$_4$. Moreover the capacity as shown in FIG. 6 was significantly lower than that shown in FIGS. 3 and 4 according to the present invention.

Example 3

NaVOPO$_4$ (According to Example 4(c) of U.S. Pat. No. 6,872,492)

NaVOPO$_4$ was prepared following Example 4(c) of Barker et al. The powder obtained was substituted for ε-VOPO$_4$ in the preparation of an electrode and electrochemical evaluation described above in Example 1. The charge-discharge curve obtained is shown in FIG. 6 and it can be recognized, especially in comparison to FIG. 3, that NaVOPO$_4$ is not capable of charge discharge cycling as demonstrated with ε-VOPO$_4$. In addition, the capacity was less than 35 mAh/g which is much less than the capacity of approximately 55 mAh/g obtained with the cathode of the present invention.

The invention claimed is:

1. A sodium ion electrochemical cell having a positive electrode comprising
ε-VOPO$_4$ as an active ingredient.

2. The sodium ion electrochemical cell of claim 1, wherein the positive electrode further comprises a material selected from the group consisting of NaFePO$_4$, NaVPO$_4$F, Na$_3$V$_2$(PO$_4$)$_2$F$_3$, Na$_2$FePO$_4$F, Na$_3$V$_2$(PO$_4$)$_3$, a compound of formula Na$_x$CoO$_2$ wherein x is from 0.4 to 1, orthorhombic Na$_{0.44}$MnO$_2$, layered sodium iron oxide of formula NaFeO$_2$, a sodium chromium oxide of formula NaCrO$_2$, layered NaNi$_{0.5}$Mn$_{0.5}$O$_2$, a NaV$_6$O$_{15}$ nanorod; a layer sulfide of formula Na$_x$TiS$_2$, a perovskite transition metal fluoride and a Na$^+$ superionic conductor (NASICON) compound.

3. The sodium ion electrochemical cell of claim 1, wherein the positive electrode further comprises a conductive additive.

4. The sodium ion electrochemical cell of claim 1, wherein the positive electrode further comprises a binder selected from the group consisting of a polyvinylidenefluoride (PVDF), a polytetrafluoroethylene (PTFE), a styrene butadiene rubber (SBR), and a polyimide.

5. The sodium ion electrochemical cell of claim 1, wherein the positive electrode further comprises a sodium insertion product of formula:

Na$_x$(ε-VOPO$_4$)

wherein x is a value from 0.1 to 2.0 and the Na is capable of reversible extraction and insertion with the ε-VOPO$_4$.

6. The sodium ion electrochemical cell of claim 5, wherein the positive electrode further comprises an auxiliary material selected from the group consisting of NaFePO$_4$, NaVPO$_4$F, Na$_3$V$_2$(PO$_4$)$_2$F$_3$, Na$_2$FePO$_4$F, Na$_3$V$_2$(PO$_4$)$_3$, a compound of formula Na$_x$CoO$_2$ wherein x is from 0.4 to 1, orthorhombic Na$_{0.44}$MnO$_2$, layered sodium iron oxide of formula NaFeO$_2$, a sodium chromium oxide of formula NaCrO$_2$, layered NaNi$_{0.5}$Mn$_{0.5}$O$_2$, a NaV$_6$O$_{15}$ nanorod; a layer sulfide of formula Na$_x$TiS$_2$, a perovskite transition metal fluoride and a Na$^+$ superionic conductor (NASICON) compound.

7. The sodium ion electrochemical cell of claim 5, wherein the positive electrode further comprises a conductive additive.

8. The sodium ion electrochemical cell of claim 5, wherein the positive electrode further comprises a binder selected from the group consisting of a polyvinylidenefluoride (PVDF), a polytetrafluoroethylene (PTFE), a styrene butadiene rubber (SBR), and a polyimide.

9. A reversible sodium battery comprising:
an anode;
a cathode; and
an electrolyte comprising sodium ions;
wherein the cathode comprises a current collector and an active material of formula (I):

$$\epsilon\text{-VOPO}_4 \quad (I).$$

10. The reversible sodium battery of claim 9, wherein the cathode further comprises an auxiliary material selected from the group consisting of $NaFePO_4$, $NaVPO_4F$, $Na_3V_2(PO_4)_2F_3$, $Na_2FePO_4F$, $Na_3V_2(PO_4)_3$, a compound of formula $Na_xCoO_2$ wherein x is from 0.4 to 1, orthorhombic $Na_{0.44}MnO_2$, layered sodium iron oxide of formula $NaFeO_2$, a sodium chromium oxide of formula $NaCrO_2$, layered $NaNi_{0.5}Mn_{0.5}O_2$, a $NaV_6O_{15}$ nanorod; a layer sulfide of formula $Na_xTiS_2$, a perovskite transition metal fluoride and a $Na^+$ superionic conductor (NASICON) compound.

11. The reversible sodium battery of claim 9, wherein the cathode further comprises a conductive additive.

12. The reversible sodium battery of claim 9, wherein the cathode further comprises a binder selected from the group consisting of a polyvinylidenefluoride (PVDF), a polytetrafluoroethylene (PTFE), a styrene butadiene rubber (SBR), and a polyimide.

13. The reversible sodium battery of claim 9, wherein the electrolyte comprises a salt selected from the group consisting of $Na_2SO_4$, $NaNO_3$, $NaClO_4$, $Na_3PO_4$, $Na_2CO_3$, NaOH, $NaPF_6$, $NaN(CF_3SO_2)_2$, $NaN(SO_2F)_2$, and $NaCF_3SO_3$.

14. The reversible sodium battery of claim 9, wherein the electrolyte comprises an organic nitrile and/or carbonate solvent.

15. The reversible sodium battery of claim 14, wherein the electrolyte comprises at least one of acetonitrile, ethylene carbonate, diethyl carbonate, and propylene carbonate.

16. The reversible sodium battery of claim 9, wherein the cathode further comprises a sodium insertion product of formula:

$$Na_x(\epsilon\text{-VOPO}_4)$$

wherein x is a value from 0.1 to 1.0 and the Na is capable of reversible extraction and insertion with the $\epsilon\text{-VOPO}_4$.

17. The reversible sodium battery of claim 16, wherein the cathode further comprises an auxiliary material selected from the group consisting of $NaFePO_4$, $NaVPO_4F$, $Na_3V_2(PO_4)_2F_3$, $Na_2FePO_4F$, $Na_3V_2(PO_4)_3$, a compound of formula $Na_xCoO_2$ wherein x is from 0.4 to 1, orthorhombic $Na_{0.44}MnO_2$, layered sodium iron oxide of formula $NaFeO_2$, a sodium chromium oxide of formula $NaCrO_2$, layered $NaNi_{0.5}Mn_{0.5}O_2$, a $NaV_6O_{15}$ nanorod; a layer sulfide of formula $Na_xTiS_2$, a perovskite transition metal fluoride and a $Na^+$ superionic conductor (NASICON) compound.

18. The reversible sodium battery of claim 16, wherein the cathode further comprises a conductive additive.

19. The reversible sodium battery of claim 16, wherein the cathode further comprises a binder selected from the group consisting of a polyvinylidenefluoride (PVDF), a polytetrafluoroethylene (PTFE), a styrene butadiene rubber (SBR), and a polyimide.

20. The reversible sodium battery of claim 16, wherein the electrolyte comprises a salt selected from the group consisting of $Na_2SO_4$, $NaNO_3$, $NaClO_4$, $Na_3PO_4$, $Na_2CO_3$, NaOH, $NaPF_6$, $NaN(CF_3SO_2)_2$, $NaN(SO_2F)_2$, and $NaCF_3SO_3$.

21. The reversible sodium battery of claim 16, wherein the electrolyte comprises a carbonate solvent.

22. The reversible sodium battery of claim 16, wherein the electrolyte comprises at least one of ethylene carbonate, diethyl carbonate, and propylene carbonate.

* * * * *